(12) United States Patent
Gysling

(10) Patent No.: US 7,690,266 B2
(45) Date of Patent: Apr. 6, 2010

(54) PROCESS FLUID SOUND SPEED DETERMINED BY CHARACTERIZATION OF ACOUSTIC CROSS MODES

(75) Inventor: Daniel L. Gysling, Glastonbury, CT (US)

(73) Assignee: Expro Meters, Inc., Wallingford, CT (US)

( * ) Notice: Subject to any disclaimer, the term of this patent is extended or adjusted under 35 U.S.C. 154(b) by 0 days.

(21) Appl. No.: 12/061,032

(22) Filed: Apr. 2, 2008

(65) Prior Publication Data

US 2009/0249887 A1  Oct. 8, 2009

(51) Int. Cl.
*G01F 1/20* (2006.01)
*G01F 1/66* (2006.01)

(52) U.S. Cl. ........... 73/861.18; 73/861.26; 73/861.27
(58) Field of Classification Search .................. None
See application file for complete search history.

(56) References Cited

U.S. PATENT DOCUMENTS

| 4,262,523 | A | 4/1981 | Stansfeld |
| 4,823,613 | A | 4/1989 | Cage et al. |
| 4,972,724 | A | 11/1990 | Ricken |
| 5,048,349 | A | 9/1991 | Wolff |
| 5,224,372 | A | 7/1993 | Kolpak |
| 5,488,870 | A | 2/1996 | Yoshimura et al. |
| 5,594,180 | A | 1/1997 | Carpenter et al. |
| 5,827,977 | A | 10/1998 | Ortiz et al. |
| 6,318,156 | B1 | 11/2001 | Dutton et al. |
| 6,575,043 | B1 | 6/2003 | Huang et al. |
| 6,732,575 | B2 | 5/2004 | Gysling et al. |
| 6,986,276 | B2 | 1/2006 | Gysling et al. |
| 7,013,715 | B2 | 3/2006 | Dutton et al. |
| 7,040,181 | B2 | 5/2006 | Rieder et al. |
| 7,058,549 | B2 * | 6/2006 | Gysling et al. ............. 702/189 |
| 7,062,976 | B2 * | 6/2006 | Gysling et al. ........... 73/861.18 |
| 7,086,278 | B2 * | 8/2006 | Gysling et al. ............. 73/61.41 |
| 7,096,719 | B2 | 8/2006 | Gysling |
| 7,152,460 | B2 | 12/2006 | Gysling et al. |
| 7,228,740 | B2 | 6/2007 | Sinha |
| 7,295,933 | B2 | 11/2007 | Gysling et al. |
| 7,299,705 | B2 | 11/2007 | Gysling |
| 7,343,818 | B2 | 3/2008 | Gysling et al. |
| 7,357,039 | B2 | 4/2008 | Rieder et al. |
| 7,389,187 | B2 | 6/2008 | Kersey et al. |
| 2004/0199341 | A1* | 10/2004 | Gysling et al. ................ 702/50 |
| 2004/0210404 | A1* | 10/2004 | Gysling et al. ................ 702/50 |
| 2004/0226386 | A1* | 11/2004 | Gysling et al. ........... 73/861.42 |
| 2006/0169058 | A1* | 8/2006 | Gysling ................ 73/861.355 |
| 2009/0013799 | A1* | 1/2009 | Gysling ................ 73/861.355 |

* cited by examiner

*Primary Examiner*—Harshad Patel

(57) ABSTRACT

An apparatus measures a speed of sound (SOS) in a process flow by characterizing low order acoustic cross modes in the process flow in a conduit. The apparatus includes transducers on the conduit, spaced from each other around the circumference of the conduit. The transducers generate acoustic input signals in the process flow over a range of frequencies. The apparatus includes strain sensors disposed on the conduit, spaced from each other around the cross-sectional circumference of the conduit. An SOS processor is responsive to the transducers and sensors, and is configured to identify cross-mode frequencies of the conduit and to derive therefrom the SOS in the process flow. An entrained air processor is coupled to the SOS processor to indicate a level of entrained air in the process flow.

7 Claims, 6 Drawing Sheets

PROCESS FLUID SOUND SPEED DETERMINED BY CHARACTERIZATION OF ACOUSTIC CROSS MODES

FIELD OF THE INVENTION

This invention relates to a method and apparatus for measuring a parameter of a process flow passing within a conduit.

BACKGROUND OF THE INVENTION

A fluid flow process (flow process) includes any process that involves the flow of fluid through a conduit (a pipe, a duct, etc.), as well as through fluid control devices such as pumps, valves, orifices, heat exchangers, and the like. Flow processes are found in many different industries such as the oil and gas industry, refining, food and beverage industry, chemical and petrochemical industry, pulp and paper industry, power generation, pharmaceutical industry, and water and wastewater treatment industry. The fluid within the flow process (i.e., referred to as the "process flow") may be a single phase fluid (e.g., gas, liquid or liquid/liquid mixture) and/or a multi-phase mixture (e.g. paper and pulp slurries or other solid/liquid mixtures). The multi-phase mixture may be a two-phase liquid/gas mixture, a solid/gas mixture or a solid/liquid mixture, gas entrained liquid or a three-phase mixture.

Various sensing technologies exist for measuring various physical parameters of single and/or multiphase fluids in a process flow. Such physical parameters include, for example, volumetric flow rate, composition, consistency, density, and mass flow rate.

The present invention provides a method and apparatus for measuring the speed of sound in a process flow. As is known in the art, the speed of sound in a process flow is related to various other physical parameters of the process flow.

SUMMARY OF THE INVENTION

The present invention resides in one aspect in an apparatus for measuring at lease the speed of sound (SOS) in a process flow through characterization of low order acoustic cross modes in a process fluid contained in process piping.

In one embodiment, an apparatus for measuring the SOS in a process flow in a conduit comprises first and second transducers on the conduit, spaced from each other around the cross-sectional circumference of the conduit, for generating sub-ultrasonic acoustic input signals in the process flow over a range of frequencies. There is also a plurality of strain sensors on the conduit, space from each other around the cross-sectional circumference of the conduit; and an SOS processor. The SOS processor is responsive to said strain sensors and said transducers, and is configured to identify cross-mode frequencies of the conduit and to produce from the cross-mode frequencies a signal indicative of the SOS in the process flow.

The present invention resides in another aspect in a method of determining the SOS in a process flow. The method comprises generating acoustic input signals over a range of frequencies in process flow in a conduit, sensing the pressure field in the conduit (as indicated by the strain in the conduit) in response to the input signals; detecting frequencies of one or more acoustic cross modes for the conduit; and determining the SOS in the process flow from the frequencies of the acoustic cross modes.

BRIEF DESCRIPTION OF THE DRAWINGS

In these figures like structures are assigned like reference numerals, but may not be referenced in the description of all figures.

DETAILED DESCRIPTION OF THE PREFERRED EMBODIMENTS

The present invention determines a speed of sound (SOS) in a process flow through a conduit by identifying characterizing frequencies of low order acoustic cross-modes in the conduit carrying the process flow. The frequencies of the acoustic cross-modes are matched to a theoretic structure of the conduit to provide an estimate of the SOS in the process fluid. The SOS in the process flow and, optionally, other information such as, for example, a temperature and a pressure of the process flow, may be used to determine a level of entrained air in and/or other parameters of the process flow.

According to one embodiment of the invention, first and second ultrasonic transducers are mounted on a conduit that is carrying the process flow. The first and second ultrasonic transducers transmit sound waves in a frequency range of about 0.1 to 10 MHz which, through non-linear interaction, generate low frequency acoustic signals in a range of about 10-1000 Hz. In one embodiment, the transducers are disposed at a same axial position along the length of the conduit, and spaced apart from each other around the conduit's cross-sectional circumference, to promote interaction. Sensors are mounted on the conduit for sensing a pressure field in the conduit that is generated by strain in the conduit induced in response to acoustic cross-modes. The sensors may be disposed at or near the same axial location on the conduit as the transducers and are spaced apart from each other around the conduit's cross-sectional circumference. A processor receives signals from the sensors and analyzes those signals in relation to the acoustic input signals to determine one or more frequencies associated with acoustic cross-modes of the conduit. The processor uses the cross-mode frequency to determine the SOS in the process flow. Using data that indicates the temperature and pressure of the process flow, the SOS can be used to determine the level of entrained air in the process flow.

Figure 1:
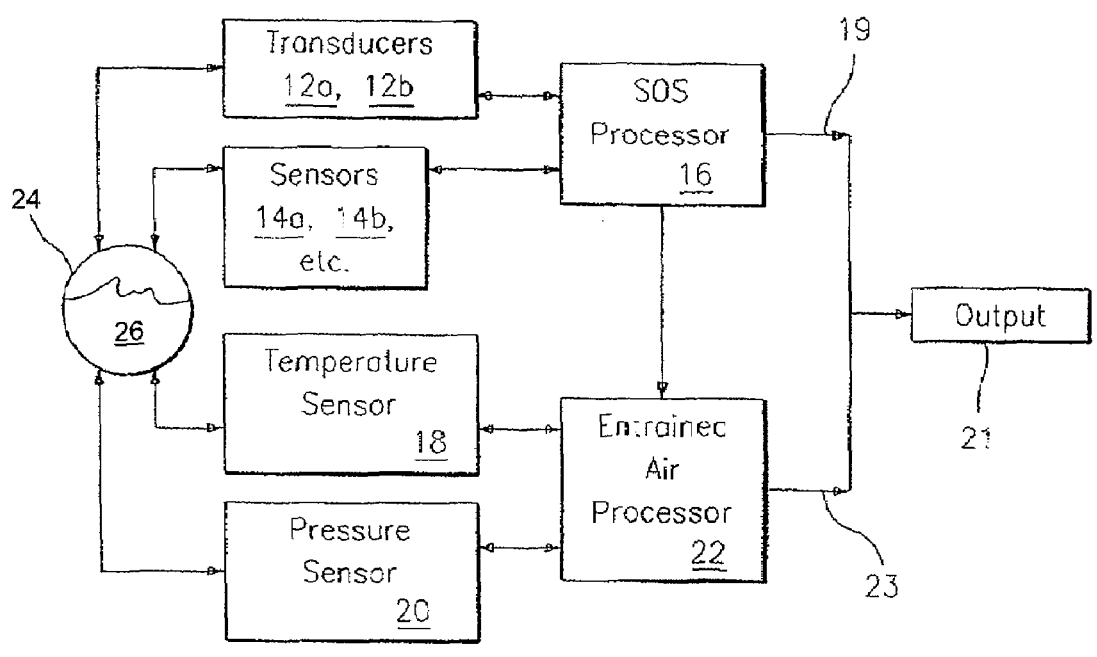
FIG. 1 is a simplified schematic view of an apparatus for determining a speed of sound in a conduit, in accordance with one embodiment of the present invention.

As illustrated in FIG. 1, an exemplary apparatus 10, configured and operating in accordance with one embodiment of the present invention, includes a plurality of transducers, shown for example, as a pair of ultrasonic transducers 12a, 12b, and an array of sensors, shown for example as sensors 14a, 14b, etc., that are coupled to a conduit 24 that contains a process flow 26. As described above, the transducers 12a and 12b transmit high frequency ultrasonic signals (e.g., in a frequency range of about 0.1 to 10 MHz) that generate, through non-linear interaction, low order acoustic input signals in a frequency range of about 10-1000 Hz). For example, in one embodiment illustrated in FIG. 2, the transducers 12a and 12b comprise a pair of ultrasonic transducers 12a' and 12b' that generate acoustic input signals 15 in response to mutually interfering ultrasonic signals 13a and 13b transmitted from the transducers 12a' and 12b', respectively. While described above as a plurality of ultrasonic transducers 12a', 12b', it should be appreciated that it is within the scope of the present invention to induce acoustic cross-modes by other techniques such as, for example, using exciters or shakers disposed on the conduit to vibrate the conduit and by like beating insonification techniques, and/or by mass injection techniques, as are generally known in the art.

The array of sensors 14a-14x (e.g., stain based sensors) are mounted on the conduit 24 at a common axial location and are spaced apart from each other around a cross-sectional circumference of the conduit (as described below) to produce signals 17a-17x, respectively, that indicate a strain in the conduit 24 generated in response to the acoustic cross mode signals 15 generated in response to the ultrasonic signals 13a and 13b from the transducers 12a' and 12b'. An SOS processor 16 determines frequency and excitation level of the input acoustic signals 15 by, for example, communicating with the transducers 12a' and 12b' to receive a reference signal (e.g., signal f1-f2 Ref) and communicating with the array of sensors 14a-14x to receive the signals 17a-17x responsive to strain of the conduit 24. The SOS processor 16 normalizes the received signals 17a-17x for the excitation level of the input acoustic cross mode signal 15 that produces the strain. Referring again to FIG. 1, in one embodiment, the apparatus 10 may include a temperature sensor 18 and a pressure sensor 20 for use by an optional entrained gas processing unit 22, as described below.

Figure 2:
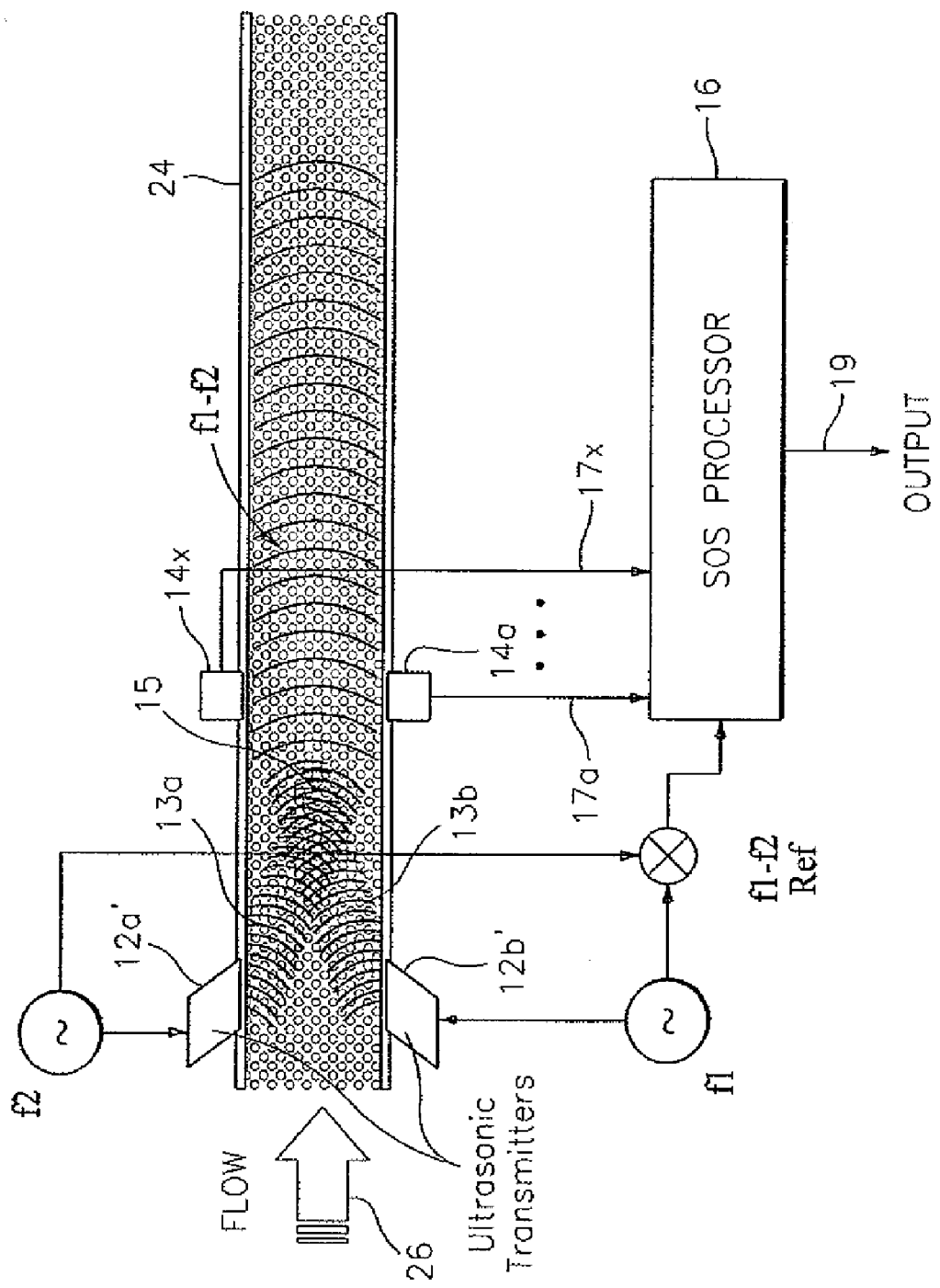
FIG. 2 is a simplified schematic view of an apparatus having a plurality of transducers and an array of sensors coupled to a conduit for measuring strain in the conduits and for determining a speed of sound in response thereto, in accordance with one embodiment of the present invention.

FIGS. 3A-3D depict cross-sectional views of the conduit 24, which for purposes of the following discussion is assumed to be a pipe having a round cross-sectional configuration. As shown in FIGS. 3A-3D, the transducers 12a and 12b and the array of sensors 14a-14x are disposed on the conduit 24 carrying the process flow 26. The transducers 12a and 12b are positioned on the conduit 24 at a common axial location and are spaced apart from each other around the cross-sectional circumference of the conduit 24 by, for example, ninety degrees (90°) measured from a central longitudinal axis of the conduit 24. As shown in FIGS. 3A-3D, the array of sensors 14a-14x, here illustrated as sensors 14a-14d for discussion purposes, are positioned on the conduit 24 at a common axial location with the transducers 12a and 12b. It should be appreciated however, that as shown in FIG. 2, it is within the scope of the present invention for the transducers 12a and 12b to be disposed at a first axial location on the pipe 24 and the sensors 14a-14d to be disposed at a second axial location on the pipe 24. For example, the second axial location is typically down stream from the first axial location. The sensors 14a-14d are spaced apart from each other around the cross-sectional circumference of the conduit 24 by, for example, about ninety degrees (90°), and offset from the transducers 12a and 12b by, for example, about forty-five degrees (45°), measured from the central longitudinal axis of the conduit 24.

Figure 3A:
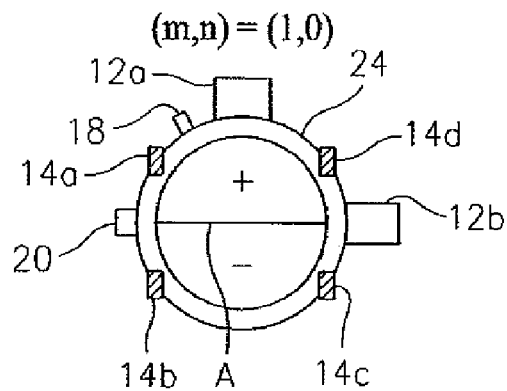
FIG. 3A-3D are schematic cross-sectional views of a conduit and the transducers and sensors of the apparatus of FIG. 1 thereon.
Figure 3C:
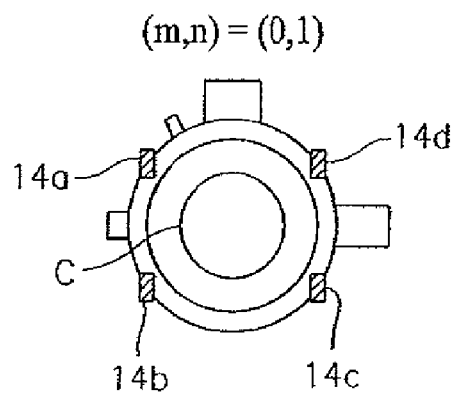

It should be appreciated that, in accordance with one embodiment of the present invention, FIGS. 3A-3D also illustrate first through fourth cross modes for the process flow 26 in the conduit 24. A typical strain response 100 in the conduit 24 for a range of the acoustic input signal 15 frequencies is depicted in FIG. 4. As shown in FIG. 4, the strain response 100 in the conduit 24 exhibits peaks at frequencies labeled f(1,0) at 110, f(2,0) at 120, f(0,1) at 130, and f(1,1) at 140, that are associated with various acoustic cross-modes of the conduit 24. A first higher cross-mode 110 in the conduit 24 occurs when a transverse pressure distribution in the conduit 24 is characterized by a single node line (e.g., a line A) across a diameter of the conduit 24, as depicted in FIG. 3A. The first higher cross-mode 110 occurs at a frequency $f_1$ in accordance with Equation 1, wherein $a_0$ is the SOS and D is the diameter of the pipe.

$$f_1 = 1.84 a_0/[\pi D] \tag{1}$$

In one embodiment, the cross-modes in the conduit 24 are identified by a "m, n notation" adopted by Munjal in "Acoustics of Ducts and Mufflers With Application to Exhaust and Ventilation System Design," J. Wiley, pub., 1987, where m indicates a number of diametrical node lines and n indicates a number of concentric circular nodes. Accordingly, the first higher cross-mode, depicted in FIG. 3A, corresponds to m=1, n=0, and thus is labeled frequency f(1,0) in FIG. 4.

Figure 3B:
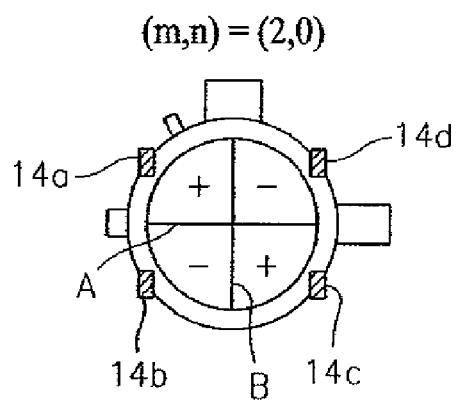
Figure 4:
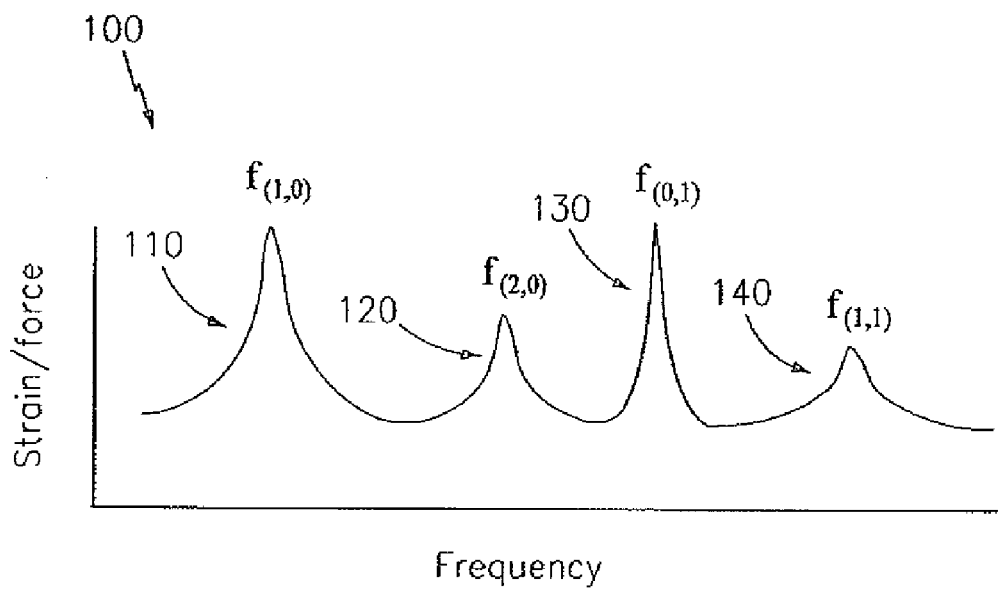
FIG. 4 is a graph that illustrates a typical strain/frequency response of a pipe.

A second higher order cross mode 120, where m=2, n=0 depicted in FIGS. 3B and 4, occurs at a frequency $f_2$ in accordance with Equation 2.

$$f_2 = 3.05 a_0/[\pi D] \tag{2}$$

As shown in FIG. 3B, the second higher cross-mode 120 in the conduit 24 occurs when two transverse pressure distributions are apparent in the conduit 24, characterized by the node line A across, for example, a horizontal diameter of the conduit 24, and a second node line B across a vertical diameter of the conduit 24.

A third higher order mode 130, where m=0, n=1 depicted in FIGS. 3C and 4, occurs at a frequency $f_3$ in accordance with Equation 3.

$$f_3 = 3.83 a_0/[\pi D] \tag{3}$$

As shown in FIG. 3C, the third higher cross-mode 130 in the conduit 24 occurs when a concentric circular node, e.g., node C, is apparent in the conduit 24.

Figure 3D:
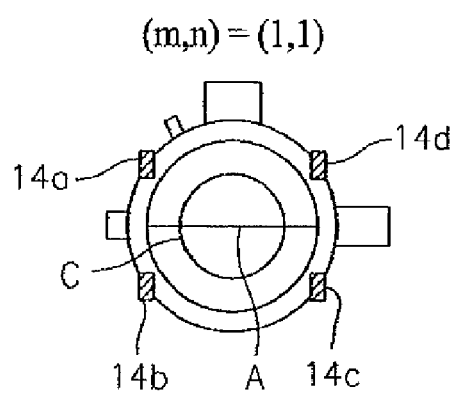

A fourth higher order mode 140, where m=1, n=1 depicted in FIGS. 3D and 4, occurs at a frequency $f_4$ in accordance with Equation 4.

$$f_4 = 5.33 a_0/[\pi D] \tag{4}$$

As shown in FIG. 3D, the fourth higher cross-mode 140 in the conduit 24 occurs when both a traverse pressure distribution is present in the conduit 24 and a concentric circular pressure distribution is present in the conduit 24, as are characterized by the node line A across a horizontal diameter of the conduit 24 and the circular node C.

Figure 5:
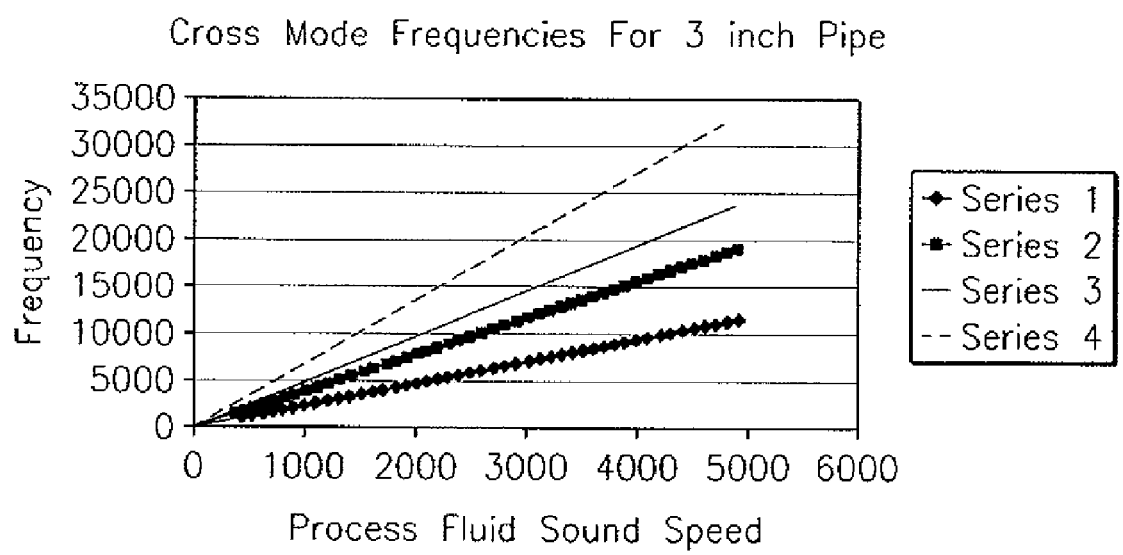
FIG. 5 is a graph that illustrates typical relationships between frequencies that characterize various cross modes and the speed of sound (SOS) in a process flow in a three-inch diameter pipe.

As illustrated in Equations (1)-(4), once one or multiple cross mode frequencies are determined in the conduit, the SOS may be determined. Illustrative relationships between frequencies that characterize various cross modes and the SOS in the process fluid in, for example, a three-inch (3 in.) diameter pipe are depicted graphically in FIG. 5. It should be appreciated that one aspect of the present invention includes characterizing the dynamic response of the process flow 26 in the conduit 24 over a relevant frequency range. As shown in FIGS. 1 and 2, the transducers 12a, 12b are controlled by the SOS processor 16, which also receives signals from the sensors 14a-14d. The SOS processor 16 is configured to identify the frequencies at the peaks of the strain response in the conduit 24, and to determine the mode (FIG. 4) and the SOS (FIG. 5) therefrom. It should be appreciated that once the SOS of the process flow 26 is determined, a variety of other parameters of the process flow can be determined as well.

By using acoustic (sub-ultrasonic) signals, the acoustic waves being generated in the process flow have wavelengths that are on the order of the pipe diameter. Therefore, the inventor has discovered that the SOS determined by the aforementioned process is applicable to determine the level of entrained air when bubbles entrained in the process flow 26 are small in relation to the diameter of the conduit 24.

In one embodiment, an entrained gas processing unit 22 (FIG. 1) assumes a nearly isothermal condition for the flow 26, as described in commonly owned, U.S. Pat. No. 7,343,818, of Gysling et al., Ser. No. 11/474,915 ("Gysling et al. '818"), which is hereby incorporated herein by reference. As noted in Gysling et al. '818, the gas volume fraction or the void fraction of a process flow comprising a mixture of air in a liquid is related to the speed of sound in the mixture by the quadratic equation:

$Ax^2+Bx+C=0$, wherein:

x is the Gas Volume Fraction, e.g., the level of entrained air;
$A=1+(Rg/Rl)*(K_{eff}/P-1)-K_{eff}/P$;
$B=K_{eff}/P-2+Rg/Rl$;
$C=1-K_{eff}/(Rl*a_{meas}^2)$;
Rg=gas density;
Rl=liquid density;
$K_{eff}$=effective K (modulus of the liquid and pipewall);
P=pressure; and
$a_{meas}$=speed of sound as measured herein.

Accordingly, the Gas Volume Fraction (GVF) is represented by the equation:

$GVF=x=(-B+(B^2-4AC)^{1/2})/(2A)$

Alternatively, the sound speed of a mixture can be related to volumetric phase fraction $\phi_1$ of the components and the sound speed (a) and densities ($\rho$) of the component through the Wood equation, Equation 5:

$$1/\rho_{mix}a_{mix\infty}^2 = \sum_{i=1}^{N}[\phi_i/\rho_i a_i^2] \quad (5)$$

Where:

$$\rho_{mix} = \sum_{i=1}^{N}\rho_i\phi_i$$

One dimensional compression waves propagating within a process flow 26 contained within the conduit 24 exert an unsteady internal pressure loading on the conduit 24. The degree to which the conduit 24, or pipe, displaces as a result of the unsteady pressure loading influences the speed of propagation of the compression wave. The relationship among the infinite domain speed of sound (SOS) and density of a mixture ($\rho_{mix}$); the elastic modulus (E), thickness (t), and radius (R) of a vacuum-backed cylindrical conduit; and the effective propagation velocity ($a_{eff}$) for one dimensional compression is given by the following expression (Eq. 6):

$$a_{eff}=1/[(1/a_{mix\infty}^2)+\rho_{mix}(2R/Et)]^{1/2} \quad (6)$$

It should be appreciated that "vacuum backed" as used herein refers to a situation in which the fluid surrounding the conduit externally has negligible acoustic impedance compared to that of the mixture internal to the conduit 24. For example, a meter containing a typical water and pulp slurry immersed in air at standard atmospheric conditions satisfies this condition and can be considered "vacuum-backed."

Figure 6:
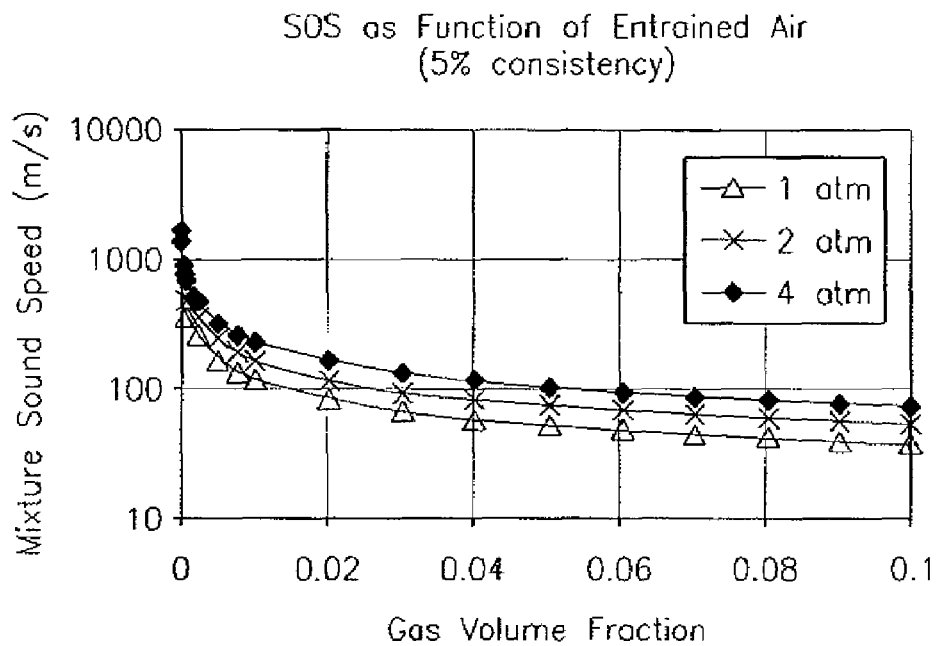
FIG. 6 is a plot of Mixture Sound Speed as a function of gas volume fraction for a 5% consistency slurry over a range of process pressures.

The mixing rule essentially states that the compressibility of a mixture ($1/\rho a^2$) is the volumetrically-weighted average compressibility of the components. For process flows 26 that comprise gas/liquid mixtures at pressure and temperatures typical of paper and pulp industry, the compressibility of gas phase is orders of magnitudes greater than that of the liquid. Thus, the compressibility of the gas phase and the density of the liquid phase primarily determine mixture sound speed and, as such, it is necessary to have a good estimate of process pressure to interpret mixture sound speed in terms of volumetric fraction of entrained gas. The effect of process pressure on the relationship between sound speed and entrained air volume fraction is shown in FIG. 6.

Figure 7:
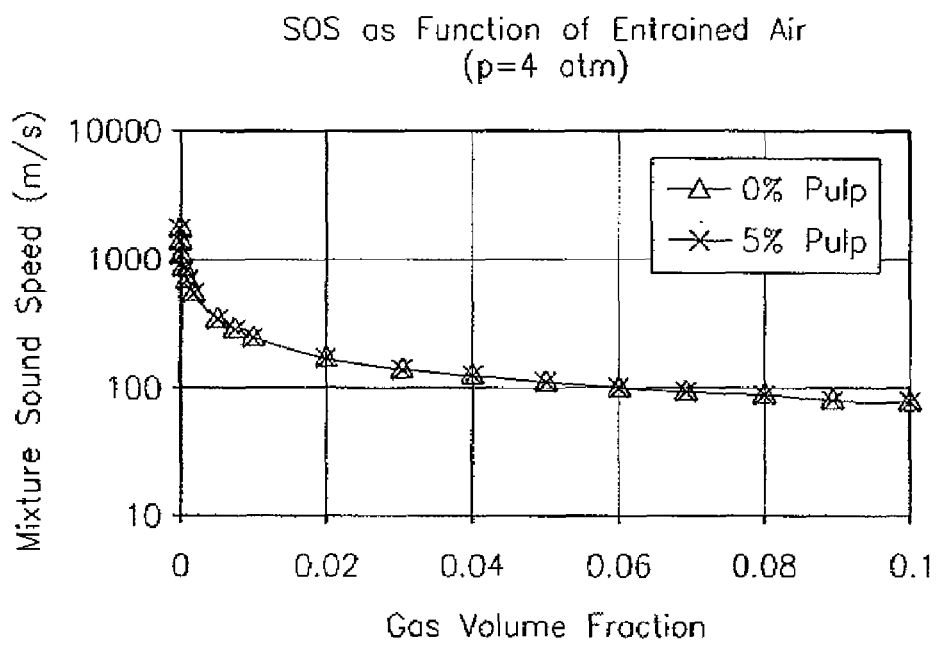
FIG. 7 is a plot of Mixture Sound Speed as a function of gas volume fraction for pure water and a 5% consistency slurry at 4 atm process pressure.

Conversely, detailed knowledge of the liquid/slurry is not required for entrained air measurement. Variations in liquid density and compressibility with changes in consistency have a negligible effect on mixture sound speed compared to the presence of entrained air. For example, FIG. 7 shows the mixture sound speed as a function of entrained air volume fraction for two pulp slurries, one with zero percent (0%) wood fiber pulp and the other with five percent (5%) wood fiber pulp by volume. As shown, the relationship between mixture sound speed and gas volume fraction is essentially indistinguishable for the two slurries. Furthermore, mixture sound speed is shown to an excellent indicator of gas volume fraction, especially for the trace to moderate amounts of entrained air, from zero to five percent (0 to 5%) by volume, typically encountered in the paper and pulp industry.

For paper and pulp slurries, the conditions are such that for slurries with non-negligible amounts of entrained gas, for example less than about one hundredth of a percent (<0.01%), the compliance of standard industrial piping (e.g., Schedule 10 or 40 steel pipe) is typically negligible compared to that of the entrained air.

Figure 8:
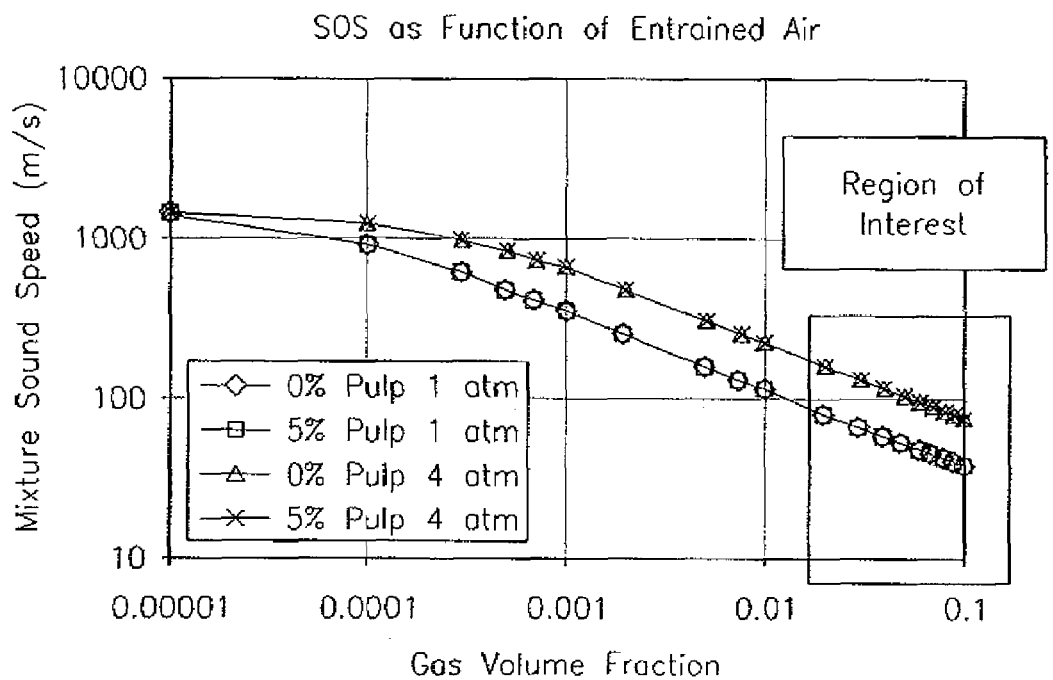
FIG. 8 is a plot of Mixture Sound Speed as a function of gas volume fraction for different consistency slurry over a range of process pressures.
Figure 9:
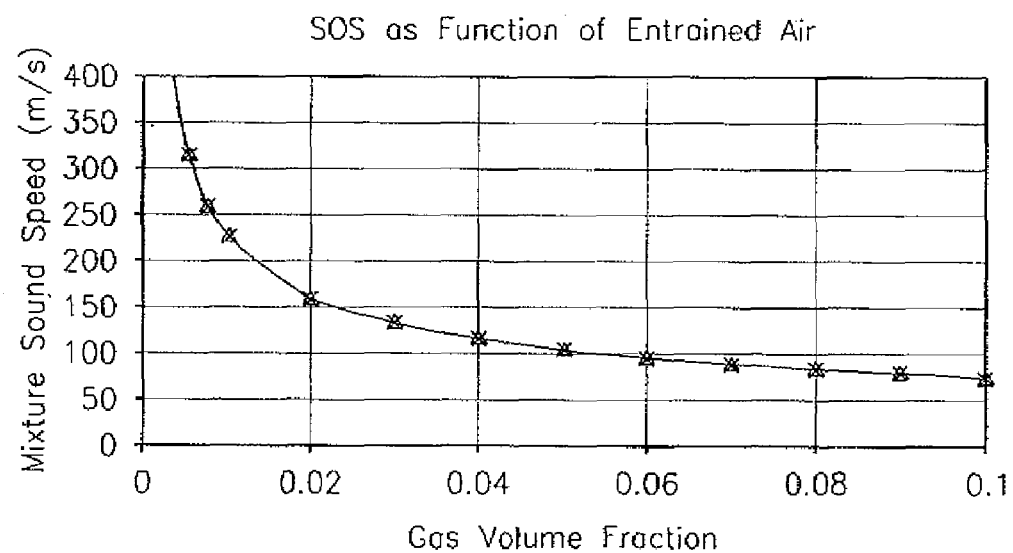
FIG. 9 is a plot of Mixture Sound Speed as a function of entrained air volume fraction for slurry at a process pressure.

FIGS. 8 and 9 illustrate relationship between sound speed and entrained air for slurries with pulp contents representative of the range used in the paper and pulp industry. Referring to FIG. 8, two slurry consistencies are shown; representing the lower limit, a pure water mixture is considered, and representing the higher end of consistencies, a five percent (5%) pulp/ninety-five percent (95%) water slurry is considered. Since the effect of entrained air on the sound speed of the mixture is highly sensitive to the compressibility of the entrained air, the effect of the entrained air is examined at two pressures, one at ambient representing the lower limit of pressure, and one at four atmospheres (4 atms) representing a typical line pressure in a paper process. As shown, the consistency of the liquid slurry, e.g., the pulp content, has little effect on the relationship between entrained air volume fraction and mixture sound speed. This indicates that an entrained air measurement could be accurately performed, within about one hundredth of a percent (0.01%), with little or no knowledge of the consistency of the slurry. FIG. 8 does show a strong dependence on pressure. Physically, the effect of pressure is linked to the compressibility of the air and thus, this indicates that reasonable estimates of line pressure and temperature would be required to accurately interpret mixture sound speed in terms of entrained air gas volume fraction.

FIGS. 8 and 9 also illustrate that for a region of interest, from about one percent (1%) entrained air to about five percent (5%) entrained air, mixture/slurry speeds of sound ($a_{mix}$) are relatively low compared to liquid-only speeds of sound. For example, the speed of sound of the pure water and the five percent (5%) pulp slurry were calculated, based on reasonable estimates of the constituent densities and compressibilities, to be 1524 m/s and 1541 m/s, respectively. The speed of sound of the mixtures with one to five percent (1% to 5%) entrained air at typical operating pressure of from about one to four atmospheres (1 atm to 4 atms) are on the order of about 100 m/sec.

Referring again to FIGS. 1 and 2, the transducers 12a, 12b transmit high frequency ultrasonic signals 13a, 13b that generate the low order acoustic input signals 15 in the process flow 26 over a range of frequencies and the signals 15 induce a responsive strain in the conduit 24 that is sensed by the sensors 14a-14x. The SOS processor 16 receives 17a-17x signals from the sensors 14a-14x over a range of frequencies of acoustic input signals 15, and detects peaks 110, 120, 130 and 140 that are associated with acoustic cross modes f1-f4 for the conduit 24. Using formulas that relate the peak frequencies to the speed of sound in the conduit 24, a signal 19 indicative of the SOS is determined. The SOS signal 19 can be conveyed to an output device 21 such as, for example, a display device for exhibiting the SOS signal 19 graphically to a user, or may be conveyed to another processor for further analysis. If pressure and temperature signals are available (e.g., via sensors 18 and 20), the entrained gas processor 22 can employ the SOS signal 19 and use the pressure and temperature signals to determine a level of entrained air in the process flow 26, and generate a signal 23 that indicates the level of entrained air. The entrained air level signal 23 can be conveyed to the output device 21 or to another processor for further analysis.

The terms "first," "second," and the like, herein do not denote any order, quantity, or importance, but rather are used to distinguish one element from another. In addition, the terms "a" and "an" herein do not denote a limitation of quantity, but rather denotes the presence of at least one of the referenced item.

Although the invention has been described with reference to particular embodiments thereof, it will be understood by one of ordinary skill in the art, upon a reading and understanding of the foregoing disclosure, that numerous variations and alternations to the disclosed embodiments will fall within the spirit and scope of this invention and of the appended claims.

What is claimed is:

1. An apparatus for measuring at least a speed of sound (SOS) in a process flow in a conduit, the apparatus comprising:
    first and second transducers positioned on the conduit at an axial position and circumferentially spaced apart from each other and generating ultrasonic signals, wherein the relative positions of the transducers is such that said signals emitted from each transducer interfere with each other to generate, sub-ultrasonic acoustic input signals in the process flow over a range of frequencies;
    a plurality of strain sensors on the conduit, spaced from each other around the cross-sectional circumference of the conduit, which strain sensors are adapted to sense strain associated with the sub-ultrasonic acoustic input signals and produce strain signals; and
    a SOS processor adapted to receive the strain signals, and configured to identify peak strains associated with cross-mode frequencies of the conduit and to produce using the peak strains associated with the cross-mode frequencies a signal indicative of the SOS in the process flow.

2. The apparatus of claim 1, wherein the SOS processor further comprises an entrained air processor that is configured to determine the level of entrained air in the process flow.

3. The apparatus of claim 2, further comprising a temperature sensor and a pressure sensor that sense temperature and pressure of the process flow in the conduit and that communicate with the entrained air processor.

4. The apparatus of claim 1, wherein the transducers are configured to generate ultrasonic signals.

5. A method for determining a speed of sound (SOS) in a process flow in a conduit, comprising:
    generating acoustic input signals in the process flow over a range of frequencies, using transducers positioned on the conduit at an axial position and circumferentially spaced apart from each other, wherein the relative positions of the transducers is such that ultrasonic signals emitted from each transducer interfere with each other to generate the sub-ultrasonic acoustic input signals in the process flow;
    sensing strain in the conduit in response to the sub-ultrasonic acoustic input signals, and producing strain signals;
    identifying peak strains associated with cross-mode frequencies of the conduit, using the strain signals; and
    determining the SOS in the process flow using the peak strains associated with the cross-mode frequencies.

6. The method of claim 5, further including determining from the SOS the level of entrained air in the process flow.

7. The method of claim 5, acoustic input signals have wavelengths on the order of the diameter of the conduit.

\* \* \* \* \*